United States Patent
Bhora et al.

(10) Patent No.: US 6,996,163 B2
(45) Date of Patent: Feb. 7, 2006

(54) WALSH-HADAMARD DECODER

(75) Inventors: Veerendra Bhora, Sunnyvale, CA (US); Pulakesh Roy, Sunnyvale, CA (US); Tibor Boros, San Francisco, CA (US)

(73) Assignee: ArrayComm, Inc., San Jose, CA (US)

( * ) Notice: Subject to any disclaimer, the term of this patent is extended or adjusted under 35 U.S.C. 154(b) by 164 days.

(21) Appl. No.: 10/402,039

(22) Filed: Mar. 27, 2003

(65) Prior Publication Data

US 2004/0190604 A1 Sep. 30, 2004

(51) Int. Cl.
*H04B 15/00* (2006.01)
*H04K 1/00* (2006.01)
*H04L 27/30* (2006.01)

(52) U.S. Cl. .................... 375/150; 375/147; 375/259; 708/410; 708/400

(58) Field of Classification Search ........ 375/140–142, 375/147, 150, 259, 316; 708/410, 400
See application file for complete search history.

(56) References Cited

U.S. PATENT DOCUMENTS

| | | | | |
|---|---|---|---|---|
| 4,446,530 A | * | 5/1984 | Tsuboka | 708/400 |
| 4,839,844 A | * | 6/1989 | Watari | 708/410 |
| 5,561,618 A | * | 10/1996 | Dehesh | 708/400 |
| 5,644,523 A | * | 7/1997 | Lin | 708/607 |
| 5,726,925 A | * | 3/1998 | Hyun et al. | 708/410 |
| 5,856,935 A | * | 1/1999 | Moy et al. | 708/410 |
| 6,028,889 A | * | 2/2000 | Gude et al. | 375/150 |
| 6,311,202 B1 | | 10/2001 | Hahm | |
| 6,732,130 B2 | * | 5/2004 | Shoji | 708/400 |

* cited by examiner

*Primary Examiner*—Phuong Phu
(74) *Attorney, Agent, or Firm*—Blakely, Sokoloff, Taylor & Zafman LLP

(57) ABSTRACT

In one embodiment, a Walsh-Hadamard decoder can have a hardware efficient Fast Hadamard Transform ("FHT") engine. In one embodiment, the FHT engine can include an input to receive an input sequence to be decoded into a Walsh-Hadamard codeword. The FHT engine can further include a controller to correlate the received input sequence with a plurality of Walsh-Hadamard codewords using two add/subtract modules. In one embodiment, the two add/subtract modules operate in parallel.

4 Claims, 10 Drawing Sheets

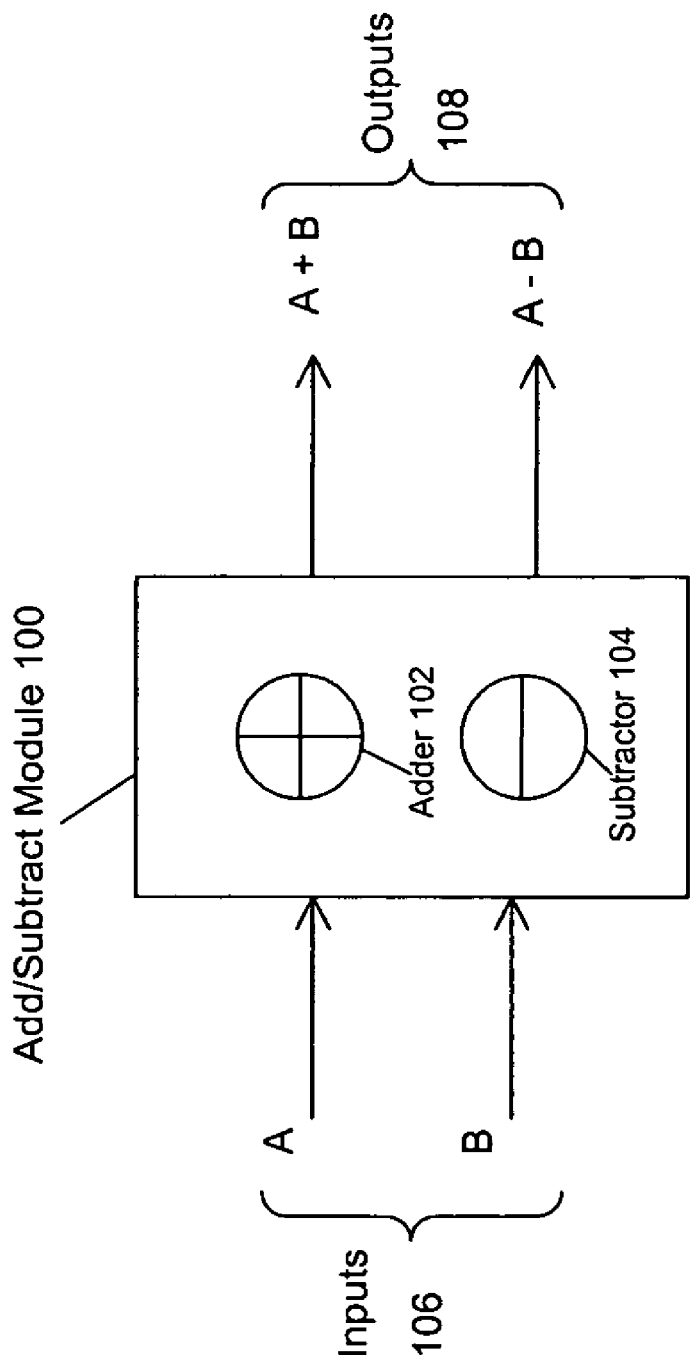
Figure 1 [Prior Art]

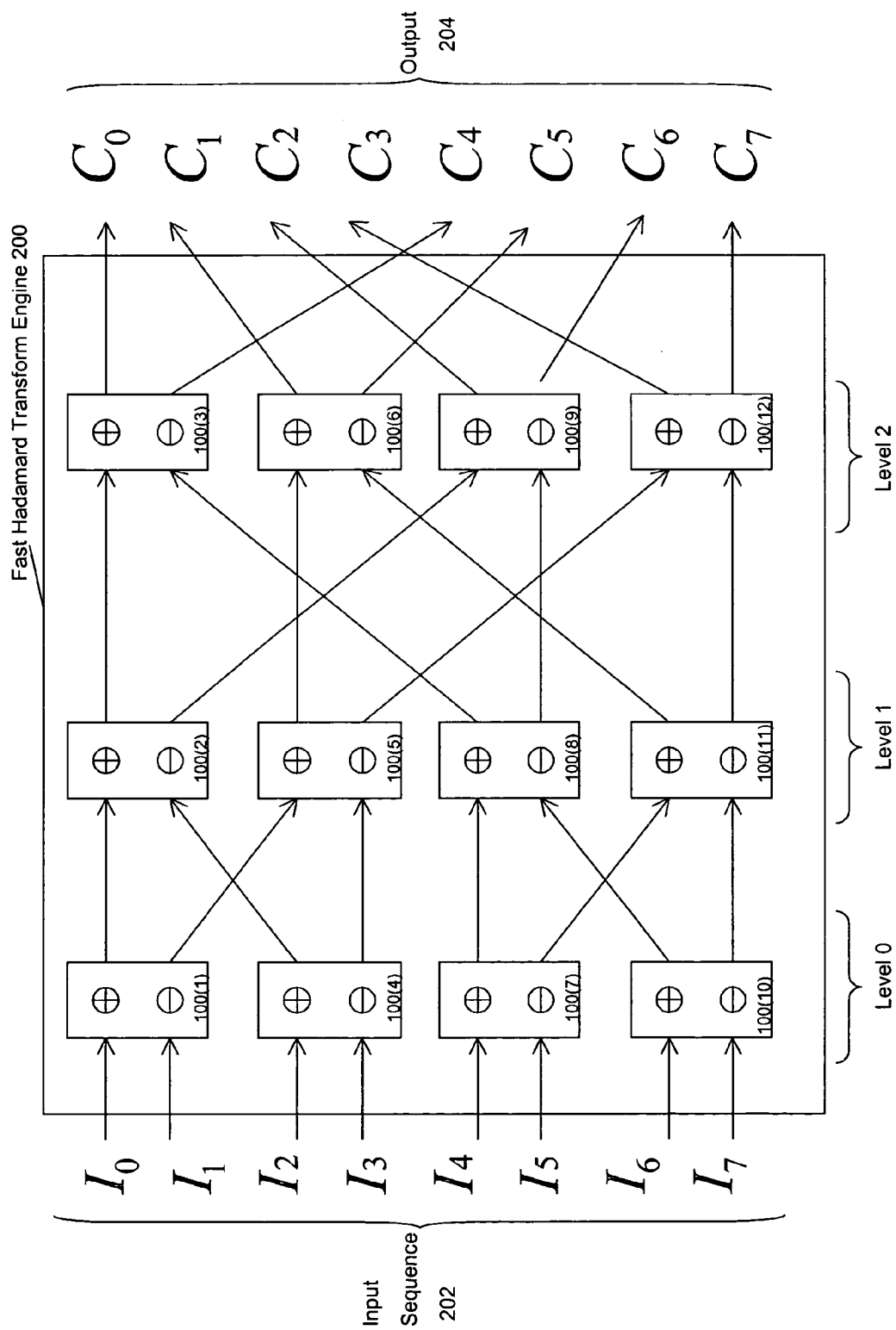
Figure 2 [Prior Art]

WALSH-HADAMARD DECODER

BACKGROUND OF THE INVENTION

1. Field of the Invention

The present invention applies to the field of data communications and, in particular, to a Walsh-Hadamard decoder.

2. Description of the Prior Art

In data communications, a need occasionally arises to compare a received sequence to one or more possible expected sequences. These sequences may be sequences of signal samples, modulation symbols, constellation points, bits, or any other data representation. When correlating one received sequence against a number of possible sequences, it can be helpful if the possible sequences have low auto- and cross-correlations. Various such sequences are known.

One set of sequences with desirable auto- and cross-correlation properties are the set of Walsh-Hadamard codewords of some given length. A Walsh-Hadamard decoder correlates a received codeword with all of the possible Walsh-Hadamard codewords. A transmitter selects one of these Walsh-Hadamard codewords, and transmits the codeword over a communications medium, such as radio waves, coaxial cable, optic fiber, or twisted pair. The communications medium may not be perfect because of noise or other factors, and errors can be introduced into the codeword as it is being transmitted.

A receiver receives the transmission of the codeword from the transmitter as a sequence that resembles, but is not identical to the transmitted codeword. The Walsh-Hadamard decoder determines which codeword was originally transmitted based on the received sequence. The Walsh-Hadamard decoder first correlates the received sequence with all possible Walsh-Hadamard codewords, and then chooses the codeword that has the highest correlation with the sequence as the most likely transmitted codeword.

The correlations performed by the Walsh-Hadamard decoder are computationally intensive. When implemented in hardware, Walsh-Hadamard decoders use large numbers of logic gates. Furthermore, the number of necessary logic gates increases significantly with the length of the Walsh-Hadamard code used. The large number of logic gates drives up the cost of a chip or ASIC having a Walsh-Hadamard decoder.

BRIEF SUMMARY OF THE INVENTION

In one embodiment, a Walsh-Hadamard decoder can have a hardware efficient Fast Hadamard Transform ("FHT") engine. In one embodiment, the FHT engine can include an input to receive an input sequence to be decoded into a Walsh-Hadamard codeword. The FHT engine can further include a controller to correlate the received input sequence with a plurality of Walsh-Hadamard codewords using two add/subtract modules. In one embodiment, the two add/subtract modules operate in parallel.

BRIEF DESCRIPTION OF THE DRAWINGS

The present invention is illustrated by way of example, and not by way of limitation, in the figures of the accompanying drawings in which like reference numerals refer to similar elements and in which:

FIG. 1 is a simplified block diagram of an add/subtract module used to implement an embodiment of the present invention;

FIG. 2 is a simplified block diagram of a conventional Fast Hadamard Tranfrom engine;

DETAILED DESCRIPTION OF THE INVENTION

Figure 3A:
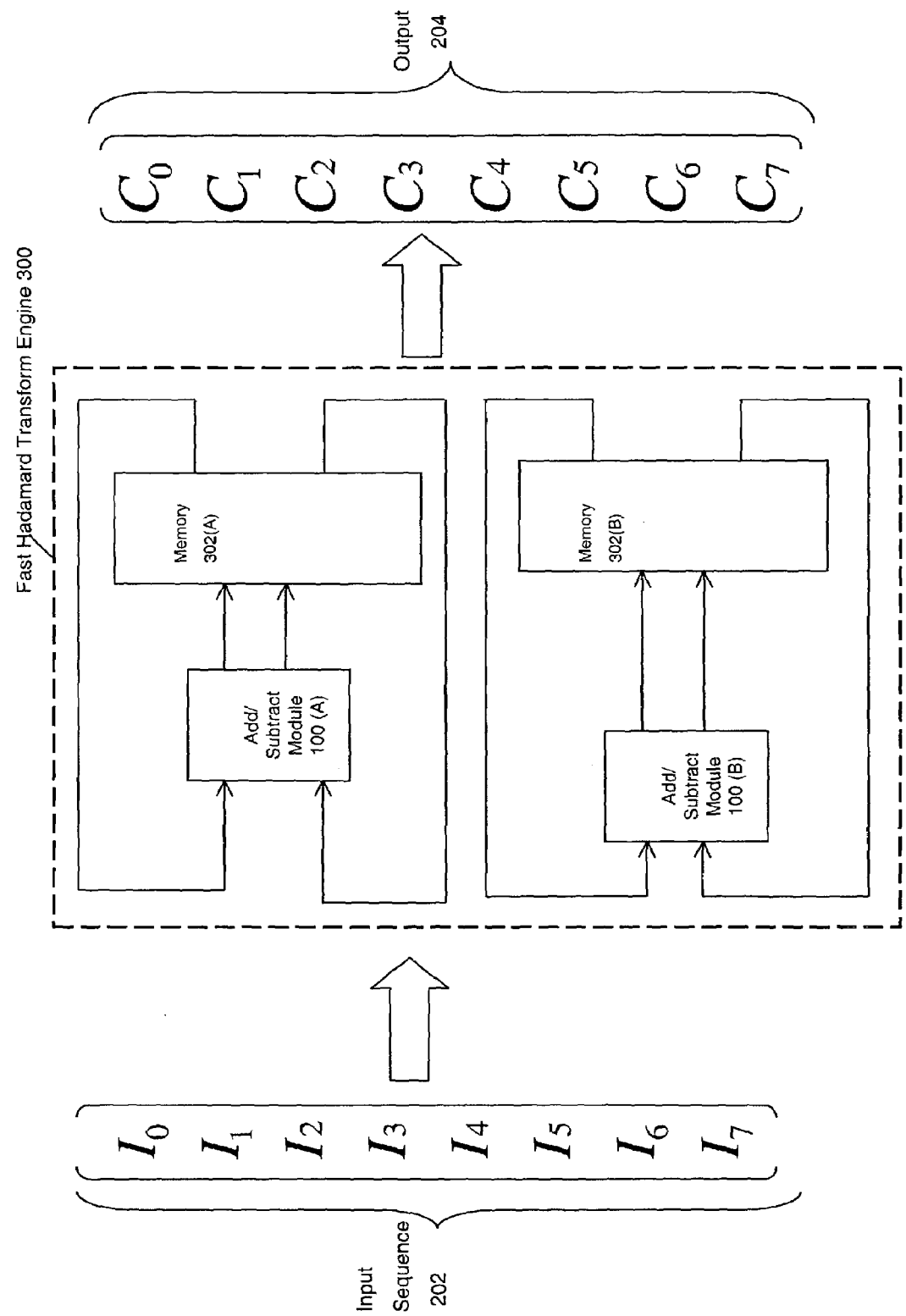
FIG. 3A is a simplified block diagram of an efficient Fast Hadamard Transform engine according to one embodiment of the present invention.

According to one embodiment of the invention, a Walsh-Hadamard decoder has a hardware efficient Fast Hadamard Transform ("FHT") engine that is fast enough for telecommunications functionality. The FHT engine correlates an input sequence with all Walsh-Hadamard codewords. The FHT engine has two add/subtract modules and two dual-port RAMs. In the first phase, the input sequence is partitioned between the two dual-port RAMs in such a manner that each add/subtract module only needs to access one of the RAMs. Because of this, in the second phase, the two add/subtract modules can operate in parallel to perform the necessary arithmetic.

Walsh-Hadamard Decoders

One key task performed by a Walsh-Hadamard decoder is calculating the correlation of the received sequence with each possible Walsh-Hadamard codeword. For example, if the Walsh-Hadamard codewords used are length eight, then this task can be represented mathematically as:

$$\begin{bmatrix} C_0 \\ C_1 \\ C_2 \\ C_3 \\ C_4 \\ C_5 \\ C_6 \\ C_7 \end{bmatrix} = \begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} \begin{bmatrix} I_0 \\ I_1 \\ I_2 \\ I_3 \\ I_4 \\ I_5 \\ I_6 \\ I_7 \end{bmatrix} \quad (1)$$

In Equation 1, $I_0$ to $I_7$ represent the input sequence. In one embodiment, these I values are complex numbers representing the in-phase and quadrature components of a received signal, i.e. I/Q points. The rows of the square matrix represent the Walsh-Hadamard codewords—also known as Walsh codewords—of length eight. The square matrix is the 8×8 Walsh-Hadamard transform matrix. Square Walsh-Hadamard transform matrixes are defined for any length that is a power of two, e.g. 8, 16, 32, 64, and so on.

The values $C_0$ to $C_7$ represent the correlation of the input sequence with each of the rows of the square matrix. As described above, one key task of the Walsh-Hadamard decoder is to calculate the C values in Equation 1. The operation in Equation 1 is generally referred to as a Walsh-Hadamard transform, i.e. the eight I values are transformed into the eight C values. Thus, the task of calculating the C values can be accomplished by performing a Walsh-Hadamard transform on the input sequence. In hardware, this function can be implemented using a Fast Hadamard Transform (FHT). After the FHT calculates the correlations, the Walsh-Hadamard decoder can select the decoded codeword by finding the highest correlation.

When using a FHT to calculate the C values, i.e. the correlations, it is often necessary to find the sum and the difference of two values. This can be accomplished in hardware using an add/subtract module. One add/subtract module that can be used to implement one embodiment of the present invention is shown in FIG. 1. The add/subtract module 100 includes an adder 102 and a subtractor 104, each of which can be implemented in simple logic. The add/subtract module 100 requires two inputs 106 (A and B in FIG. 1) and produces two outputs 108. The outputs 108 are the sum and difference of the two inputs 106; in FIG. 1 the sum of the two inputs 106 is A+B and the difference of the two inputs 106 is A−B.

A conventional engine that performs the FHT uses an array of add/subtract modules, as shown in FIG. 2. FIG. 2 is an example of a conventional implementation of a length eight FHT engine 200 to carry out the Walsh-Hadamard transform Walsh shown in Equation 1. The FHT engine 200 of FIG. 2 has twelve add/subtract modules 100(1)–(12), each of which functions as the add/subtract module 100 described with reference to FIG. 1. The twelve add/subtract modules 100(1)–(12) are arranged in three levels—labeled level 0, level 1, and level 2—and connected in the manner shown in FIG. 2. In level 0, the add subtract modules 100 process original input sequence values, in level 1 they process sum and differences of two original input sequence values, and in level 2 they process sums and differences of four original input sequence values. When the input sequence 202 is provided to the FHT engine 200, the ouputs 204 are the correlations $C_0$ to $C_7$.

The conventional FHT engine 200 for an input sequence 202 of eight values already needs twelve add/subtract modules. The number of add/subtract modules increases significantly with the length of the codewords. For example, 192 add/subtract modules are needed when the length of the codewords is increased to 64.

Walsh-Hadamard Decoder with Two Add/Subtract Modules

Figure 3B:
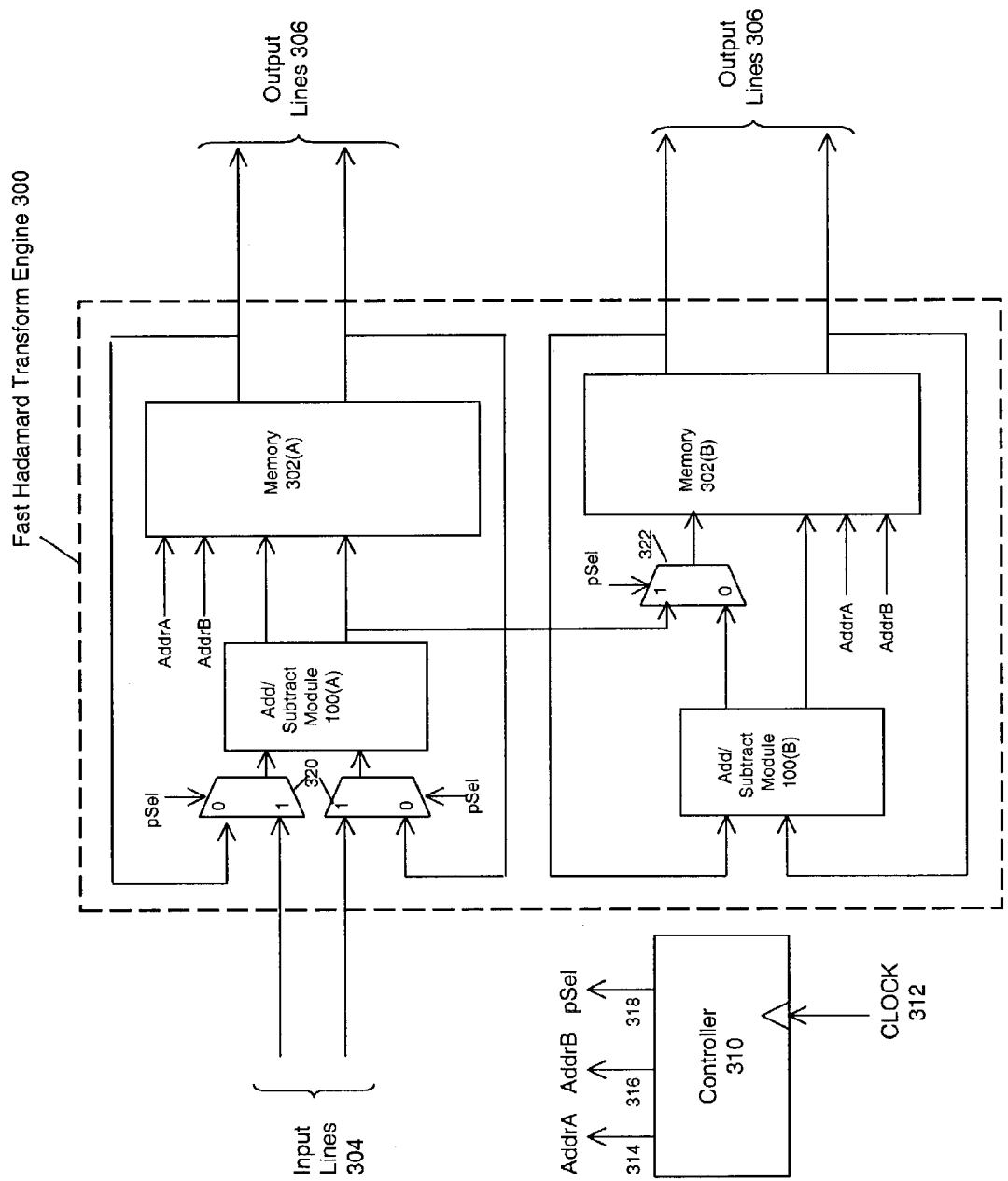
FIG. 3B is a more detailed simplified block diagram of the efficient Fast Hadamard Transform engine according to one embodiment of the present invention.

One embodiment of the present invention is now set fourth with reference to FIGS. 3A and 3B. The FHT engine 300 shown in FIG. 3A performs the same function as the FHT engine 200 shown in FIG. 2; namely, it produces the correlations 204 in Equation 1 of an input sequence 202 with length eight Walsh-Hadamard codewords. However, the FHT engine 300 described with reference to FIG. 3A uses only two add/subtract modules 100(A)–(B) to perform the correlations.

As shown in FIG. 3A, the FHT engine 300 includes two memory storage units, Memory 302(A) and Memory 302(B). These memories store intermediate values during the decoding process. In order to improve the processing speed of the FHT engine 300, the intermediate values can be partitioned between the memory 302(A) and memory 302(B) in such a manner that each of the two add/subtract modules 100(A) and 100(B) only needs to read from and write to one memory. For example in FIG. 3A, add/subtract module 100(A) only accesses and writes to memory 302(A), and add/subtract module 100(B) only accesses and writes to memory 302(B). Because of this partitioning, the add/subtract modules 100(A) and 100(B) do not have to wait for each other and can be operated in parallel.

A more detailed illustration of one embodiment of the FHT engine 300 is now set fourth with reference to FIG. 3B. In this embodiment, the input sequence 202 is read in pairs on the input lines 304. The partitioning of the intermediate values into memory 302(A) and memory 302(B) is performed using two input multiplexers 320 coupled to the input lines 304 and another multiplexer 322 coupled to one output of add/subtract module 100(A). These multiplexers are controlled by a controller 310 that generates a control signal 318 herein referred to as pSel (short for phase-select).

At first, the pSel 318 signal is "1," indicating that the partitioning phase is in progress. As shown in FIG. 3B, when the pSel 318 signal is "1," add/subtract module 100(A) operates on a pair of inputs and provides the sum of the two inputs to memory 302(A) and the difference of the two inputs to memory 302(B). The pSel 318 signal is "1" for the first four clock cycles of clock 312 while all of the I values of the input sequence are read, and the intermediate values are partitioned between the memory 302(A) and memory 302(B).

After this initial partitioning phase, the pSel 318 signal is set to "0" by the controller 310 indicating that the processing phase is in progress. As shown in FIG. 3B, when the pSel 318 signal is "0" each add/subtract module 100(A)–(B) accesses only one of memories 302(A) and 302(B) for the duration of the operation of the FHT engine 300. Thus, during the processing phase, the decoder 300 functions substantially as discussed with reference to FIG. 3A.

In one embodiment, memories 302(A) and 302(B) are dual-ported memories. A dual-ported, or dual-port, memory can accommodate two simultaneous memory accesses. For example, two locations of a dual-port memory can be read from or written to simultaneously. Using dual-port memories results in two inputs provided to each add/subtract module 100(A)–(B) with every clock 312 cycle.

In one embodiment, in addition to the pSel 318 signal, the controller also generates two address signals, AddrA 314 and AddrB 316. These address signals 314 and 316 determine the read and write locations of memory 302(A) whose values are accessed by add/subtract module 100(A) and the read and write locations of memory 302(B) whose values are accessed by add/subtract module 100(B).

In the embodiment shown in FIG. 3B, the same two address signals 314 and 316 can be used. In this embodiment, each memory 302(A) and 302(B) has four memory locations. Thus, with the two add/subtract modules operating in parallel, the second and third levels of processing, i.e. the processing phase, can be performed in two clock 312 cycles each. The eight correlations can be read in groups of four using the output lines 306.

One embodiment for generating the address signals by the controller 310 is described with reference to FIG. 4. Since both memory 302(A) and memory 302(B) have four locations, two bits are enough to provide the addresses. Thus, the controller 310 in FIG. 4 uses a two-bit counter 402 to generate the addresses. The two-bit counter 402 produces two bits, b[0] and b[1] with every clock 312 cycle in an incremental fashion, i.e. counting from binary "0" to binary "3."

Figure 4:
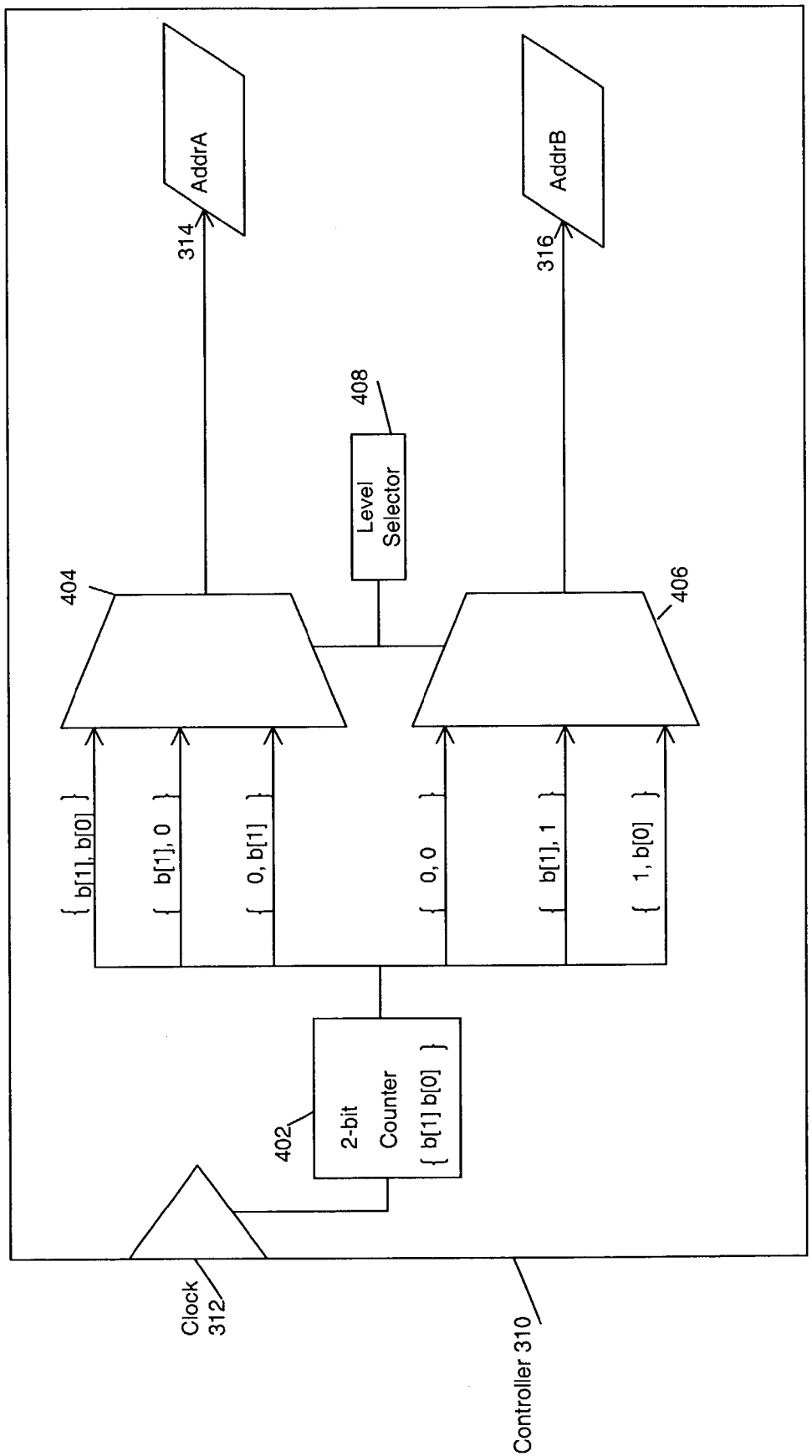
FIG. 4 is a more detailed simplified block diagram of a controller that can be used by the efficient Fast Hadamard Tranform engine according to one embodiment of the present invention.

The two bits are arranged in six configurations as shown in FIG. 4. Three of the configurations are connected to 3-to-1 multiplexer 404 and the other three of the configurations are connected to 3-to-1 multiplexer 406. A level selector 408 chooses which of the three inputs is selected by the multiplexers 404 and 406. The level selector chooses between the inputs based the level of processing being carried out by the add/subtract modules 100(A) and (B). In this embodiment, since there are three levels, the level selector can be implemented as a modulo three counter.

These levels of processing refer to levels 0–2 described with reference to FIG. 2. The modulo three counter can be configured to count once for every four counts by the two-bit counter 402, that is, every time the two-bit counter 402 restarts. From FIG. 4 it appears that, during the partitioning phase, the multiplexer 406 produces a static output, since only one address is used to partition the intermediate values.

Walsh-Hadamard Decoder for Any Length Codeword

The architecture for the FHT engine 300 described with reference to FIGS. 3A–B can be used by a Walsh-Hadamard decoder to correlate received input sequences with Walsh-Hadamard codewords of any length. The size memories 302(A) and 302(B) can be increased to accommodate more intermediate values, and the controller 310 can be expanded to generate correspondingly more addresses.

For example, if the input sequence and the Walsh-Hadamard codewords that the input sequence is correlated with are of length 64, then both memory 302(A) and memory 302(B) in FIG. 3B can be expanded to have 32 address locations to store intermediate values. The expanded controller 310 for the FHT engine 300 using length 64 codewords is described with reference to FIGS. 5A and 5B.

Figure 5A:
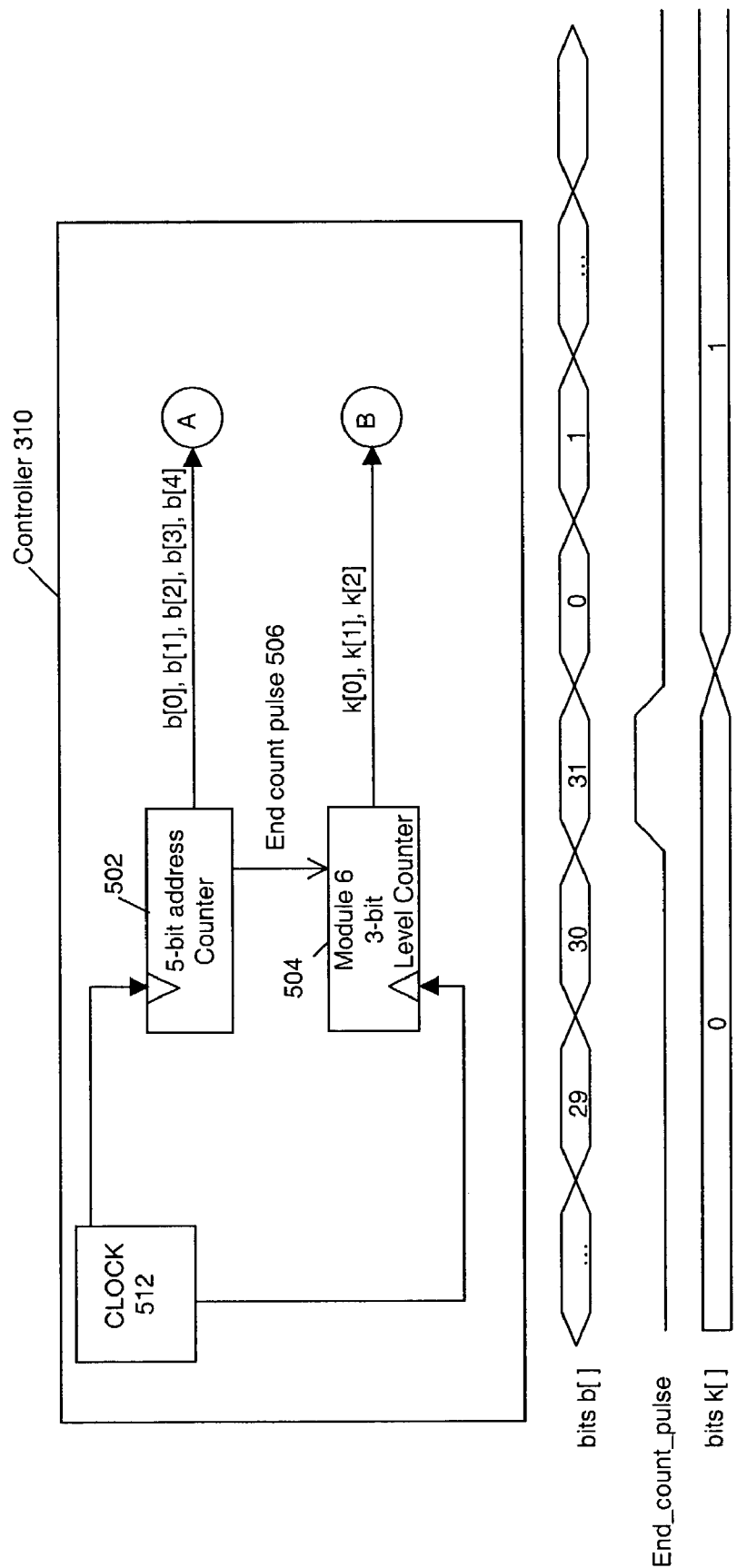
FIG. 5A is a simplified block diagram of a controller that can be used by another implementation of the efficient Fast Hadamard Transform engine according to another embodiment of the present invention.

In FIG. 5A, clock 512 provides the timing reference to a 5-bit counter 502 and a 3-bit counter 504. The 5-bit counter 502 is the address counter that generates the 5-bits that are assembled into an address for the 32 locations of memories 302(A) and 302(B). The 3-bit counter 504 is the level counter. There are six levels of processing for length 64 codewords. Thus, the 3-bit counter 504 is a modulo 6 counter that increments each time it receives an end count pulse 506 from the 5-bit counter 502. The clock cycle diagram shown under the controller 310 further illustrates the relationship between the counters 502 and 504 of the dual counter architecture.

Figure 5B:
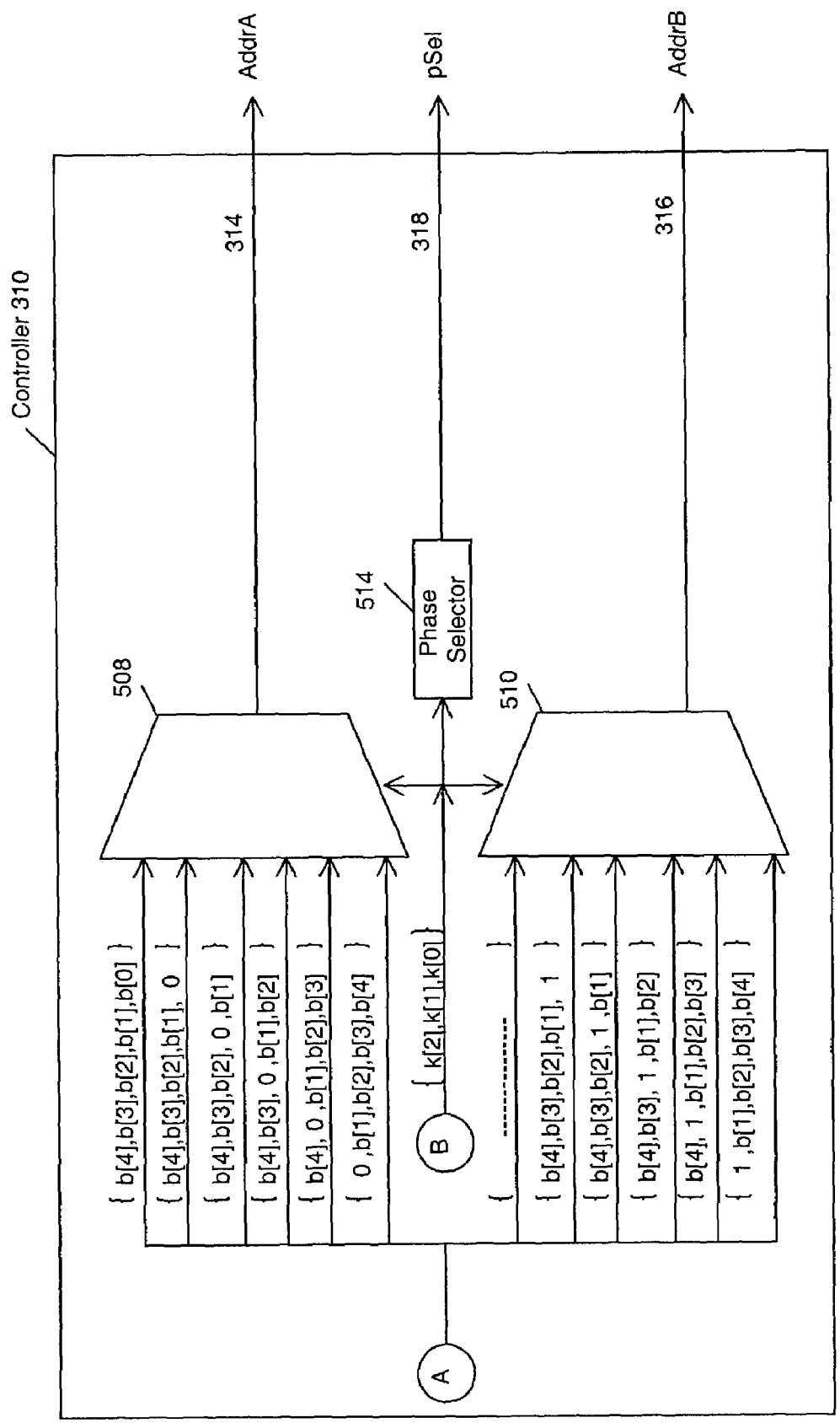
FIG. 5B is a continuation of FIG. 5A.

The five bits of output of the 5-bit address counter 502 for each clock 512 cycle is represented in FIG. 5A as b[0],b[1], b[2],b[3],and b[4]. The three bits of output of the 3-bit level counter 504 for each clock 512 cycle is represented in FIG. 5A as k[0],k[1],and k[2]. The output of the address counter 502 is input into 6-to-1 multiplexer 508 and 6-to-1 multiplexer 510 as shown in FIG. 5B. The output or the level counter 504 functions as the select signal for the multiplexers 508 and 510. Thus, with each clock 512 cycle, two addresses (314 and 316 in FIG. 3) are generated.

The output of the level counter 504 is also input for a phase selector 514, that generates the pSel 318 signal described with reference to FIG. 3B. In one embodiment, the phase selector sets pSel 318 to "1" when the level counter 504 indicates that level 0 is in progress (the partitioning phase) and to "0" otherwise (the processing phase). Following similar expansions as described above, the architecture shown in FIGS. 3A and 3B can be used to accommodate input sequences of any length, though by definition, Walsh-Hadamard codewords have lengths that are powers of two.

Alternate Memory Configurations

The architecture of FHT engine 300 described with reference to FIGS. 3A and 3B is only one possible architecture for implementing the present invention. Alternate memory configurations can be implemented without substantially altering the partitioning and parallel processing methodologies described above. For example, one quad-port memory can be used instead of two dual-port memories 302(A) and 302(B). According to another configuration shown in FIG. 6, a single dual-port memory 602 can replace memories 302(A) and 302(B).

Figure 6:
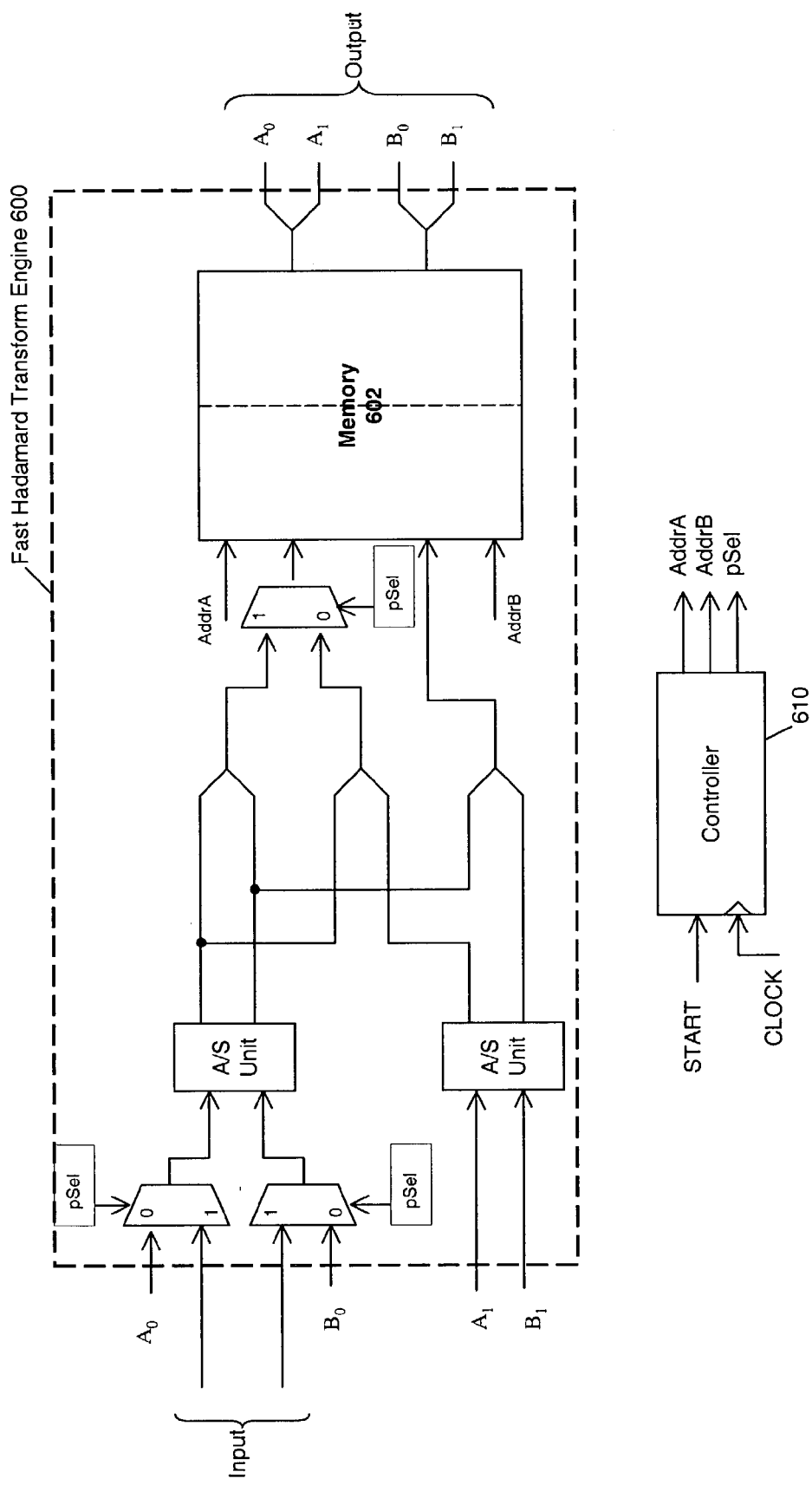
FIG. 6 is a simplified block diagram of an efficient Fast Hadamard Transform engine according to another embodiment of the present invention.

In one embodiment described with reference to FIG. 6, memory 602 is twice as wide as memories 302(A) and 302(B). At each location, memory 602 stores two intermediate values concatenated together. At each read from a memory 602 location, these values are separated into the respective intermediate values. Controller 610, and other aspects of the FHT engine 600 function substantially identically to similar components discussed with reference to FIG. 3B.

In yet another embodiment, two more memories can be added to the FHT engine 300 architecture described with reference to FIG. 3 to double the processing speed using a ping-pong technique. Ping-ponging is a well-known technique to increase memory access speed by allowing the add/subtract module to simultaneously read input from one memory and write output data to another memory. For example, with reference to FIG. 1, input values A and B would be read from a first dual port memory and output values A+B and A−B would be written to a second dual port memory in the same clock cycle. This technique can be referred to as "ping-pong" because at each level of processing, the intermediate values bounce back and forth between the two additional memories and memories 302(A) and 302(B) in FIG. 3B.

Base Station Structure

Figure 7:
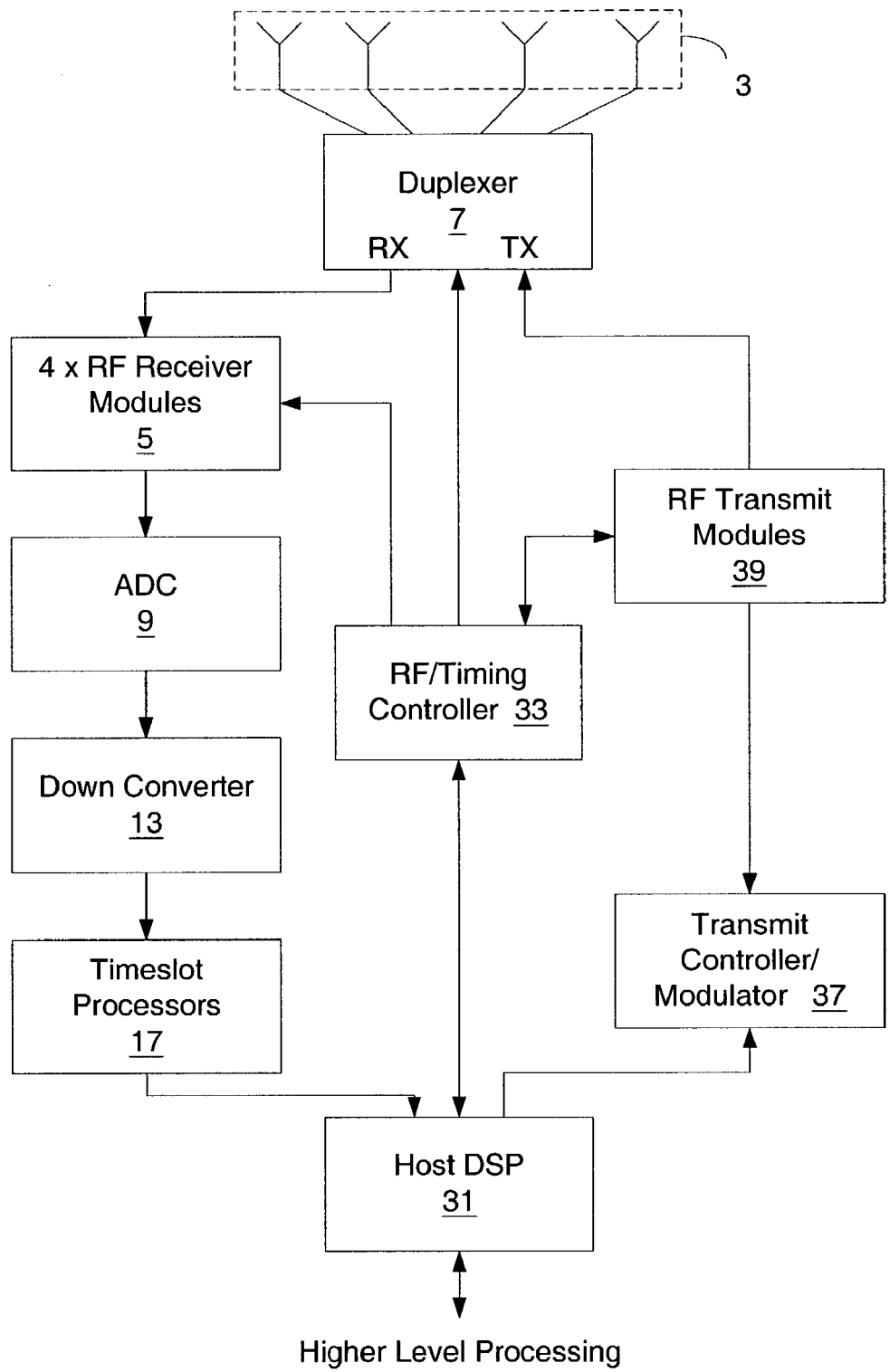
FIG. 7 is a simplified block diagram of a base station on which an embodiment of the invention can be implemented.

The FHT engine 300 described with reference to FIGS. 3A and 3B can be used to create an efficient Walsh-Hadamard decoder for any communications system. FIG. 7 shows an example of a base station of a wireless communications system or network suitable for implementing the present invention. The system or network includes a number of subscriber stations, also referred to as remote terminals or user terminals, such as that shown in FIG. 8. The base station may be connected to a wide area network (WAN) through its host DSP 31 for providing any required data services and connections external to the immediate wireless system. To support spatial diversity, a plurality of antennas 3 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 (hereinafter "timeslot processor") for further processing, including calibration, according to one aspect of this invention. Eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station. Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, upconverted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7.

User Terminal Structure

Figure 8:
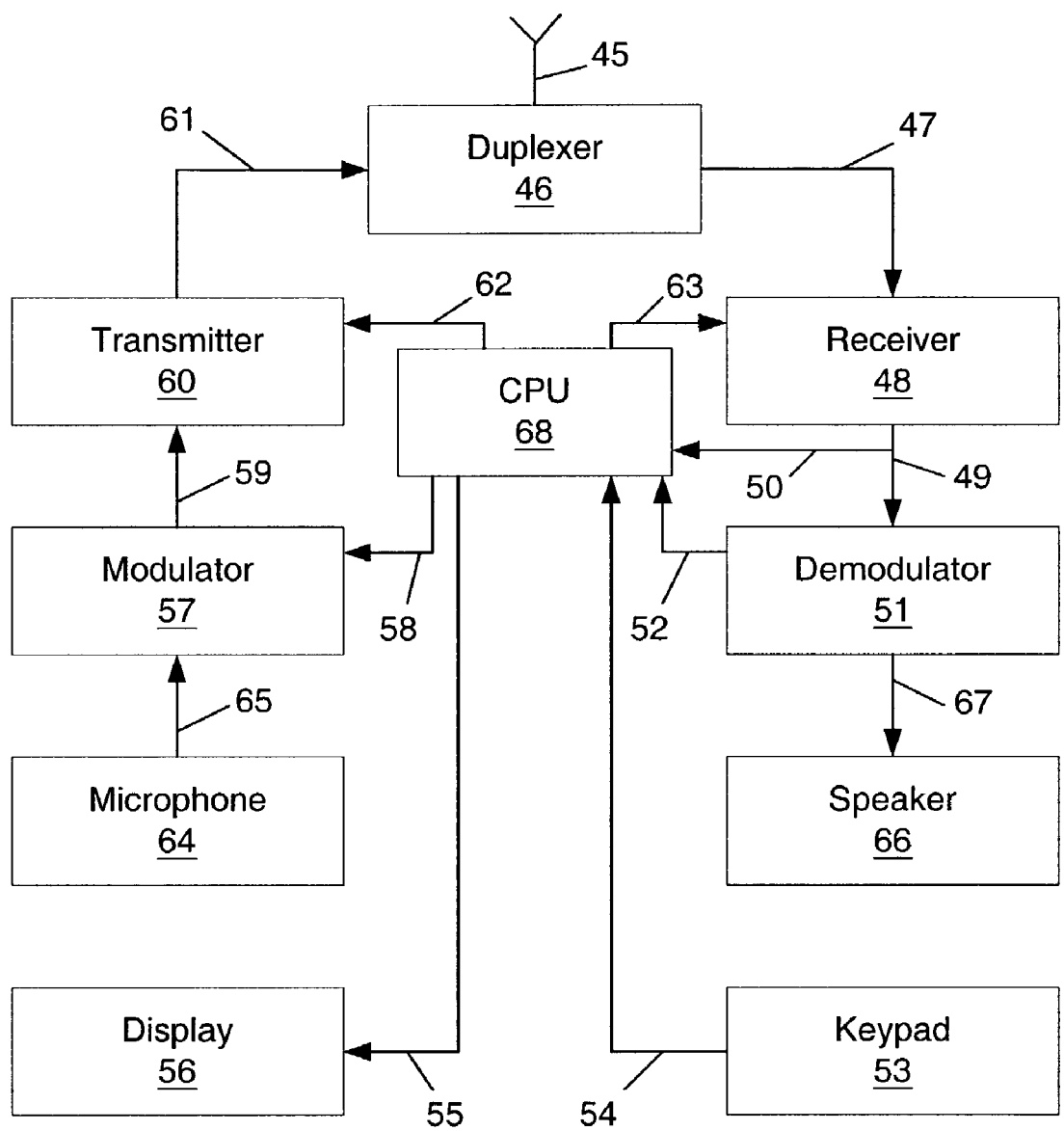
FIG. 8 is a simplified block diagram of a remote terminal on which an embodiment of the invention can be implemented.

FIG. 8 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 3 and 4, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an antenna array. However, the user terminals can also contain antenna arrays, and can also perform spatial processing both on receiving and transmitting (uplink and downlink) within the scope of the present invention.

Embodiments of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Numerous changes can be made to the above architectures. For example, four or eight add/subtract modules can be used. The partitioning stage becomes longer when more than two add/subtract modules are used. However, once the intermediate values are partitioned, all add/subtract units can operate in parallel as described above.

Many of the methods and calculations are described in their most basic form, but steps can be added to or deleted from any of the methods and information can be added or subtracted from any of the described message signals without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A Fast Hadamard Transform ("FHT") engine comprising:
a controller to generate a phase-select signal, the phase select signal indicating whether the FHT engine is in a partitioning phase or a processing phase;
a first memory;
a second memory;
a first add/subtract module configured to receive an input sequence representing a signal, and to output intermediate values to the first memory and the second memory in response to the phase-select signal indicating the partitioning phase;

wherein the first add/subtract module is configured receive intermediate values stored in the first memory, and to replace the received intermediate values in the first memory with the output of the first add/subtract module in response to the phase-select signal indicating the processing phase.

2. The FHT engine of claim 1, further comprising a second add/subtract module configured to receive intermediate values stored in the second memory, and to replace the received intermediate values in the second memory with the output of the second add/subtract module in response to the phase-select signal indicating the processing phase.

3. The FHT engine of claim 2, wherein the controller further generates a first and second memory address signal, .the first and second memory address identifying the two intermediate values in both the first and second memories that are to be replaced using the first and second add/subtract modules respectively.

4. The FHT engine of claim 1, wherein the first memory and the second memory each comprise a dual-port random access memory (RAM).

* * * * *